United States Patent [19]

Hattori et al.

[11] Patent Number: 5,211,844
[45] Date of Patent: May 18, 1993

[54] WASTEWATER TREATING BIOLOGICAL FILM TANK

[75] Inventors: Takashi Hattori, 5-34-104, Soshigaya -2-chome, Setagaya-ku, Tokyo; Kazuo Nakano, Yokohama, both of Japan

[73] Assignees: Nikki Hanbai Co., Ltd., Yokohama; Takashi Hattori, Tokyo, both of Japan

[21] Appl. No.: 842,308

[22] Filed: Feb. 26, 1992

Related U.S. Application Data

[62] Division of Ser. No. 667,775, Mar. 11, 1991.

[51] Int. Cl.$^5$ .............................. C02F 3/06; C02F 3/30
[52] U.S. Cl. ..................................... 210/151; 210/202; 210/259; 210/261; 210/903; 210/615
[58] Field of Search ............... 210/150, 151, 202, 220, 210/255, 258, 259, 261, 262, 304, 512.1, 615, 630, 903

[56] References Cited

U.S. PATENT DOCUMENTS

| | | | |
|---|---|---|---|
| 3,617,540 | 11/1971 | Bishop et al. | 210/903 |
| 3,709,364 | 1/1973 | Savage | 210/903 |
| 3,930,998 | 1/1976 | Knopp et al. | 210/903 |
| 4,137,171 | 1/1979 | Yokata | 210/150 |
| 4,179,374 | 12/1979 | Savage et al. | 210/903 |
| 4,454,038 | 6/1984 | Shimodaira et al. | 210/150 |
| 4,465,594 | 8/1984 | Laak | 210/903 |
| 4,839,053 | 6/1989 | Tharp | 210/150 |
| 4,933,076 | 6/1990 | Oshima et al. | 210/151 |

FOREIGN PATENT DOCUMENTS

| | | |
|---|---|---|
| 56-49637 | 11/1981 | Japan . |
| 57-122997 | 9/1982 | Japan . |
| 61-136490 | 6/1986 | Japan . |
| 63-248500 | 10/1988 | Japan . |

*Primary Examiner*—Wilbur Bascomb, Jr.
*Assistant Examiner*—Christopher Upton
*Attorney, Agent, or Firm*—Jordan and Hamburg

[57] ABSTRACT

A small-sized, low cost to manufacture and inexpensive wastewater treating biological film tank by which wastewater produced in each home can be treated by each home. A treating tank 10 has therein multi continuous-pore soft ceramic 40. Waste or raw water is supplied into the tank from its top through a waste/raw water supplying pipe 21, and pushed up by the action of air bubble forced into the tank from its bottom through an air bubble generator 30, and then flows over through cylindrical guide 50 into the multi continuous-pore soft ceramic 40 wherein the water is purified by microorganisms which digest the nutrient in the waste or raw water. Surface area of the multi continuous-pore ceramic element 40 is about 25 times larger than that of a conventional plastic element.

7 Claims, 5 Drawing Sheets

WASTEWATER TREATING BIOLOGICAL FILM TANK

This is a division of application Ser. No. 07/667,775, filed Mar. 11, 1991.

BACKGROUND OF THE INVENTION

In recent years, biological film treatment processes have been more commonly recognized and used for treating sanitary and industrial wastewaters instead of widely adopted conventional activated-sludge processes.

The basic principle of the biological film treatment process consists in that wastewater flows and circulates around a contacting medium whereupon microorganisms accumulate and decompose organic substances included in the wastewater through oxidation, resulting in the removal of waste products.

The most important design subject of the biological film treatment process is a contacting element upon which bacterial solids accumulate. Conventionally, most attempts have aimed at maximizing surface area for bacterial growth. For example, a known rotating biological contactor employs a plastic contacting element of honeycomb structure having a surface of 200 $m^2/m^3$.

However, this plastic contacting element has not yet proved to be suitable for bacterial growth and, on the contrary, it hardly allows accumulation of bacteria due to is slippery surface. Furthermore, upon thickening of the biological layer on the plastic element, the bacteria within the layer become anaerobic and simultaneously a large amount of the layer, having a thickness of about 25 mm or more, may fall off from the plastic element. This decreases treatment efficiency. Such plastic contacting elements have the further disadvantage that they may become clogged unless they are spaced by 50 mm or more.

When purifying wastewater using microorganisms, a great problem involves how to treat inactive bacteria, that is, dead bacterial bodies. In particular, the pores of a biological film provided for attachment of bacteria may become clogged with dead bacteria, whereby it becomes necessary to replace the film with a new one. This requires maintenance and expense. For this reason, equipment for treating wastewater with biological films has only been adopted in limited circumstances by countries, local public organizations and big companies and are essentially unusable by individual people. However, since pollution of rivers and lakes is limited by sanitary waste discharges, it would be a significant achievement if every family, individual and/or medium- and small-sized enterprise could treat their liquid wastes using biological films.

SUMMARY OF THE INVENTION

In view of the foregoing, it is an object of the present invention to provide a wastewater treating biological film tank, and more particularly one which is so small and low in cost that it can be acquired by any individual and family, and require almost no maintenance.

DESCRIPTION OF THE PREFERRED EMBODIMENTS

Figure 1:
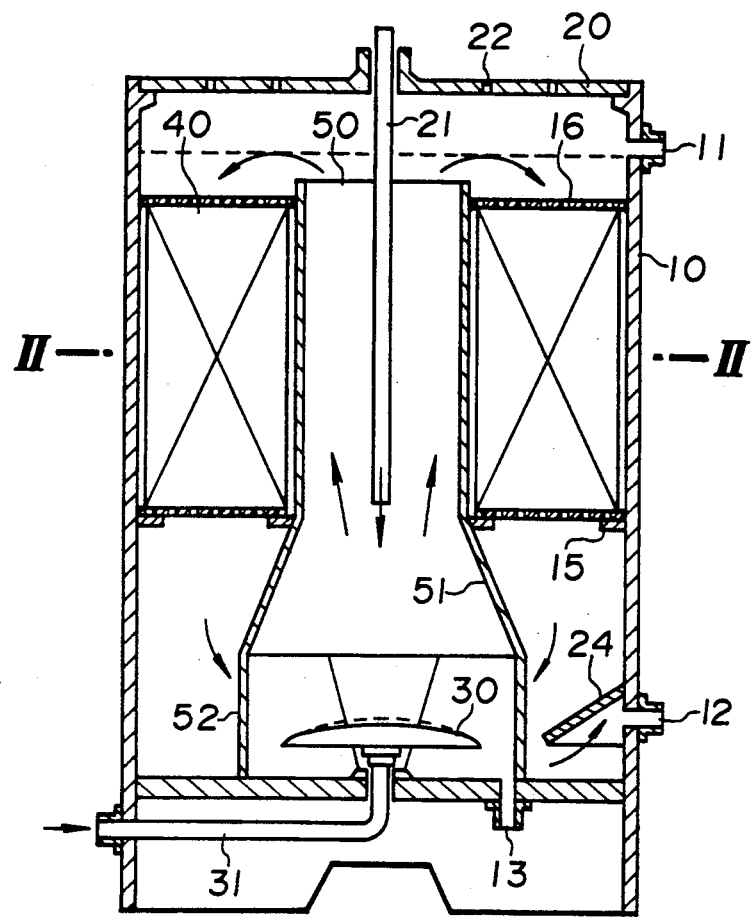
FIG. 1 is a sectional side view of a water treating biological film tank embodying the present invention.
Figure 2:
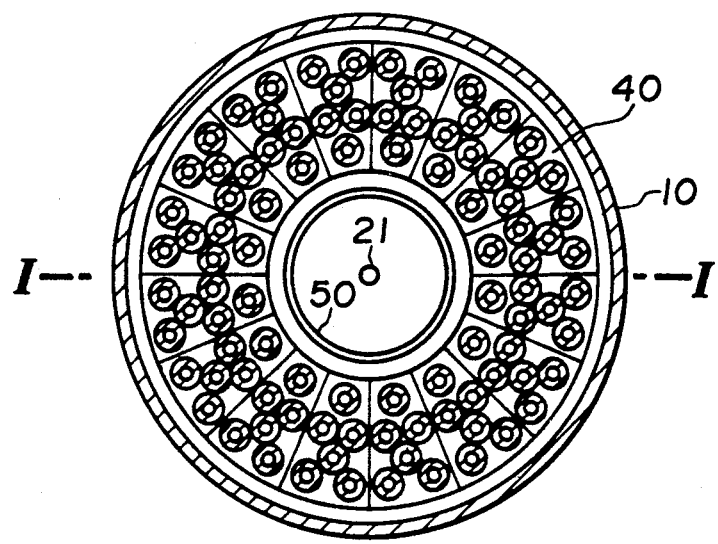
FIG. 2 is a sectional view taken along line II—II of FIG. 1.

FIG. 1 is a sectional side view (a section taken along line I—I of FIG. 2) of a water treating biological film tank embodying the present invention and FIG. 2 is a sectional view taken along line II—II of FIG. 1.

The device illustrated in FIGS. 1 and 2 basically comprises a wastewater treating tank 10, an inlet means 21 for supplying wastewater or raw water into tank 10 from an upper portion thereof, which is basically a waste or raw water supply pipe removably attached to an upper cover 20 of the tank, aeration means 30 for forcing air bubbles into tank 10 from a lower portion thereof in opposition to the supplied waste or raw water, which is basically an air bubble generator 30 connected to an air bubble supply pipe 31 provided at the lower portion of tank 10, and biological film elements 40 arranged around the periphery of the interior of tank 10, wherein wastewater or raw water supplied from the top and air bubbles supplied from the bottom contact each other. In the tank 10, microorganisms accumulated on the biological film elements 40 are supplied with sufficient oxygen from the bottom and nutrients contained in the wastewater or raw water, as a result of which the biological film elements 40 eat the nutrients in the waste or raw water to be purified.

The biological film elements 40 are made of a porous material to allow the microorganisms to easily settle thereon and the wastewater or raw water to easily pass therethrough. However, while all conventional biological films are porous, their pores become clogged with dead bacteria, resulting in the need for replacement with new films.

The present applicant has thus extensively researched the possible causes of clogging of biological films and has discovered that conventional elements 40 have many blind pores wherein a mass of dead bacteria accumulate to cause film clogging.

On the other hand, the present applicant has also previously proposed multi continuous-pore soft ceramic materials which, as disclosed in Japanese Laid Open Patent Publication No. 107582/90, have all pores communicating with each other, and he has now utilized such ceramic material as the biological film elements 40.

Test results have verified that biological film elements 40 do not become clogged and thus do not require replacement, i.e., their use enables construction of an economical wastewater or raw water treating tank which is low in cost and easy to maintain without incurring additional expense for periodic replacement of the biological film element 40.

Referring again to FIGS. 1 and 2 of the drawings, the treating tank 10 is provided with an overflow outlet 11 in its upper portion, a treated water outlet 12 in its lower side wall and a sludge (drain) outlet 13 in its bottom portion. Floating matter in waste or raw water is removed through upper overflow outlet 11, while biological solids and untreated sludge settle on the tank bottom and are discharged through bottom sludge outlet 13.

The treated water outlet 12 is provided with water guide partitions 24 at its upper, front and both sides in the tank, which allow treated water to flow out of the tank only through partitions 24 to thereby prevent treated water from being mixed with waste or raw water circulating for treatment in the tank.

In biological film treatment processes, the contacting medium (biological film) plays the most important part. A conventional plastic contacting medium has the disadvantage that as the biological layer forming on the plastic medium thickens, bacteria within the layer become anaerobic, and a mass of the bacteria slips off the plastic medium when the layer thickness reaches about 25 mm, whereby treating efficiency of the plastic film is greatly reduced. Conversely, the tank according to the present invention includes a multi continuous-pore soft ceramic material such as disclosed in Japanese Laid Open Patent Publication No. 107582/90, which serves as a biological film capable of amassing smooth alternate bacterial generations thereon in such a way that various kinds of microorganisms propagate at different propagating rates on the ceramic which may gradually be taken off the ceramic with different senile involutions. Conversely, in conventional plastic contacting mediums, a large mass of the bacterial layer falls off the medium as a result of the formation of the aforementioned anaerobic bacterial zone.

A guide cylinder 50 having a lower conical separating skirt 51 is supported by a supporting column 52 in the treating tank 10. Guide cylinder 50 forms a defined, limited space in tank 10 wherein wastewater or raw water supplied from the top and air bubbles supplied from the bottom meet with each other. In this defined space, a sufficient amount of oxygen is dissolved in wastewater or raw water and excess air is released into the atmosphere through vent holes 22 provided in top cover 20 of the tank. On the other hand, the wastewater or raw water containing a sufficient amount of oxygen dissolved therein is pushed up by the air bubbles being supplied from the bottom and flows over the top of the guide cylinder 50 onto an upper portion of the multi continuous-pore soft ceramic 40, wherein the water flows therethrough and is subjected to biological treatment by bacteria. The water flows out of the bottom of the multi continuous-pore soft ceramic 40, enters into skirt 51 through supporting column 52, and then flows upwardly in the guide cylinder 50 together with air bubbles being supplied from air bubble generator 30 to again flow over guide cylinder 50 and circulate through the soft ceramic 40.

The air bubble generator 30 generates air bubbles from air supplied through a diffusing pipe 31 provided in the lower portion of the tank and feeds the air bubbles into the separating skirt 51. This air bubble generator is constructed not to allow liquid supplied from the top of guide cylinder 50 to flow down therethrough, so that it can work reliably and also be completely protected when not operating.

The biological film element 40 of multi continuous-pore soft ceramic is secured to brackets 15 in tank 10 by means of fixing plates 16. Element 40 may be formed in any shape as desired, for example, a column, a cylinder or the like fixed as formed on the brackets 15 with fixing plate 16 in the tank 10, or lumps, columns or grains placed in meshed packaging fixed by brackets 15 and plates 16. Furthermore, the biological film element of multi continuous-pore soft ceramic material can be constructed to provide a contacting surface of 2000 to 5000 $m^2/m^3$, which is 25 times that of conventional plastic honeycomb contacting elements (max.: 200 $m^2/m^3$). Therefore, when a tank 10 having the same treating capacity as that of conventional tanks is constructed using such ceramic material, the amount of contacting material required may be a mere 4% of the conventional plastic material required, which makes it possible to greatly reduce the tank to a size suitable for use by a single home, person, small- or medium-sized enterprise.

Figure 3:
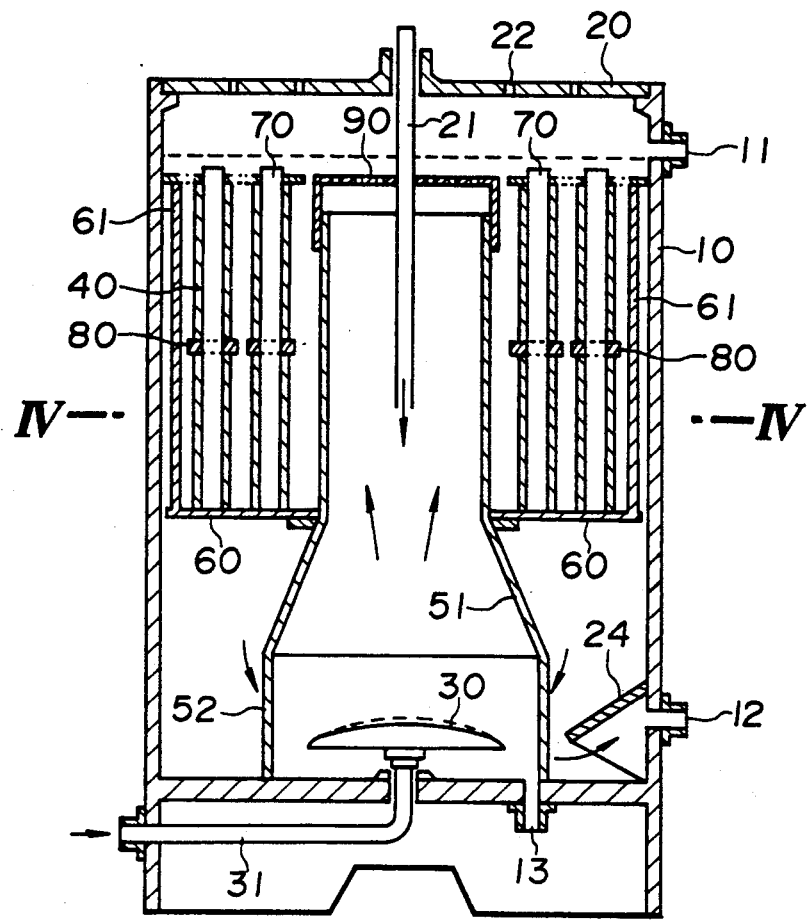
FIG. 3 is a sectional view illustrating another embodiment of the present invention.
Figure 4:
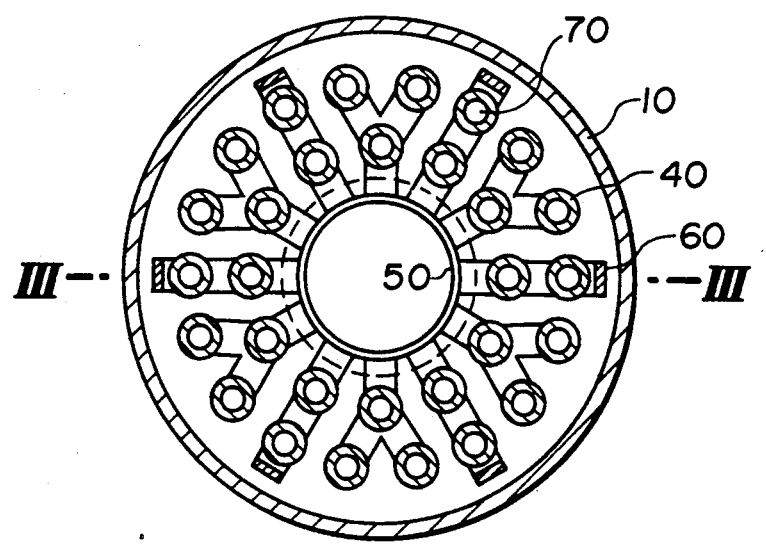
FIG. 4 is a sectional view taken along line IV—IV of FIG. 3.

FIG. 3 is a sectional side view of another wastewater treating tank embodying the present invention (as a section taken along line III—III of FIG. 4) and FIG. 4 is a sectional view taken along line IV—IV of FIG. 3. Parts similar in function to those shown in FIGS. 1 and 2 are designated by like numerals and their explanation omitted. In FIGS. 3 and 4, the treating tank 10 includes a plurality of contacting elements, each of which consists of two layers of cylindrically formed multi continuous-pore soft ceramic elements 40 which are fitted onto fixing rods 70 vertically placed on a supporting plate 60 secured to guide cylinder 50. When arranging this plurality of layers of multi continuous-pore soft ceramic elements 40, a cushioning material 80 is placed between two adjacent layers to protect the soft ceramic elements 40 from being damaged due to vibrations. The guide cylinder 50 is provided at its top with an air bubble reflux regulating sleeve 90 which serves as a damping means for regulating reflux of air bubbles supplied from air bubble generator 30. Numeral 61 designates a reinforcing frame integrally formed with supporting plate 60.

In FIGS. 3 and 4, a practical method of mounting cylindrical soft ceramic elements 40 is illustrated. However, it will be readily understood that elements 40 may be installed at any desired location in tank 10 and supporting plates 60 may also be modified in their shape and arrangement depending upon the shape and placement of soft ceramic elements 40.

Figure 5:
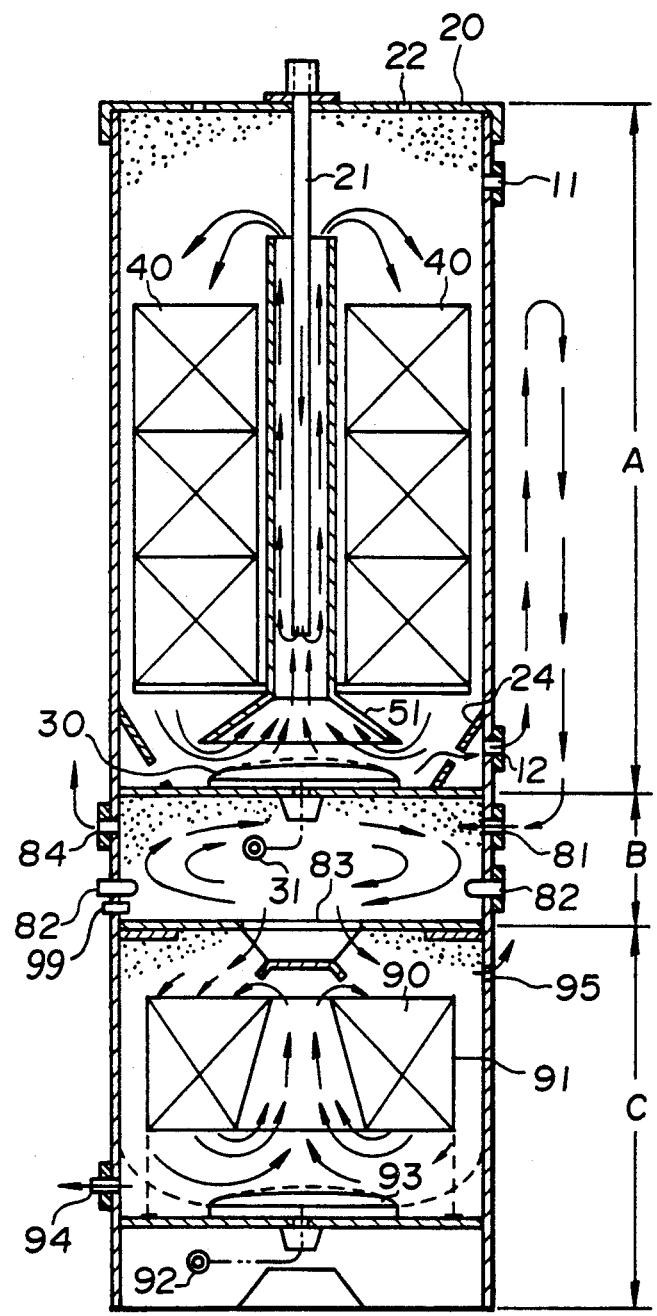
FIG. 5 is a sectional view illustrating yet another embodiment of the present invention.

FIG. 5 is a sectional side view illustrating another water treating biological film tank embodying the present invention. In FIG. 5, the tank comprises three sections, i.e., a first (upper) section A, a second (middle) section B and a third (lower) section C. The first tank section A functions in the same way as the treating tanks previously described with reference to FIGS. 1 to 4. Raw water such as lake water or the like is supplied through a raw water supply pipe 21 into the first (upper) section A wherein it is subjected to treatment with aerobic bacteria on a biological film element 40 to obtain a normal BOD (biological oxygen demand). The water thus treated for BOD passes through an outlet 12 of the first section A and enters into the second tank section B through an inlet 81 thereof.

In the second section B, the water supplied through the inlet 81 is forcibly circulated by the action of pressurized fluid such as compressed air injected into the second tank section B through fluid supply nozzles 82 to separate sludge from the water by the action of the centrifugal force produced therein. The water from which sludge has been removed then passes through a hole 83 provided in the bottom of second section B and enters into the third tank section C. A hole 84 is provided for removing air bubbles and an opening 99 is provided for removing sludge from second section B.

The third tank section C serves as a COD (chemical oxygen demand) treating portion wherein the water is subjected to treatment with facultatively anaerobic bacteria living in the presence and absence of oxygen.

The third tank section C includes a ceramic cage 91 containing therein COD-treating contacting medium 90 of multi continuous-pore soft ceramic material such as that used in the first section A. In the third tank section C, the water entered therein is diffused by air bubbles supplied through an air feeding pipe 92 and diffuser 93 (air bubble generator) arranged at the bottom of tank section C, and then it passes through the soft ceramic elements 90 wherein it is subjected to COD-treatment with the bacteria. The final treated water is discharged from the third section C through an outlet hole 94. Excess air bubbles are discharged through an air bubble removing hole 95.

Accordingly, the third tank section C is similar in construction to the first tank section A and differs from the first tank section A only in that it serves for water COD treatment while the first section provides water BOD treatment.

Drinking water (treated lake water) that smells very musty can be completely deodorized by the biological film wherein planktons of phormidium/anabaena are decomposed by candida bacteria and ammonia is decomposed by nitrosomonas and nitrobacter bacteria. A water treating tank according to the present invention can also be used for purifying into drinking water raw water from rivers, lakes and marshes. In such application, the tank is capable of easily removing bacteria and algae from the raw water.

As is apparent from the foregoing description, according to the present invention, it is possible to provide a water treating biological film tank having a small size, which is low in cost and requires little or no maintenance and no maintenance expenses, thereby being usable by each individual home, person, or medium-sized or small-sized enterprise.

Although the invention has been described in relation to embodiments for treating wastewater in homes, it will be readily understood that the invention is not limited by the described embodiments, but rather is widely applicable to purification of industrial wastewater, general service wastewater, sewage water, intermediate wastewater and the like to make them usable as intermediate water, or to protect lakes and rivers from being polluted, as well as for treating various kinds of waters used in fields such as fisheries, food industries, brewing industries and the like.

It will also easily be understood that the treating tank according to the present invention, although having a cylindrical shape in the described embodiments, can be formed in any desired shape such as a square and the like.

In the embodiment shown in FIG. 5, almost all sludge produced in each tank section is digested by biological films formed on the soft ceramic elements, which assures a high efficiency of water treatment therein.

Figure 6:
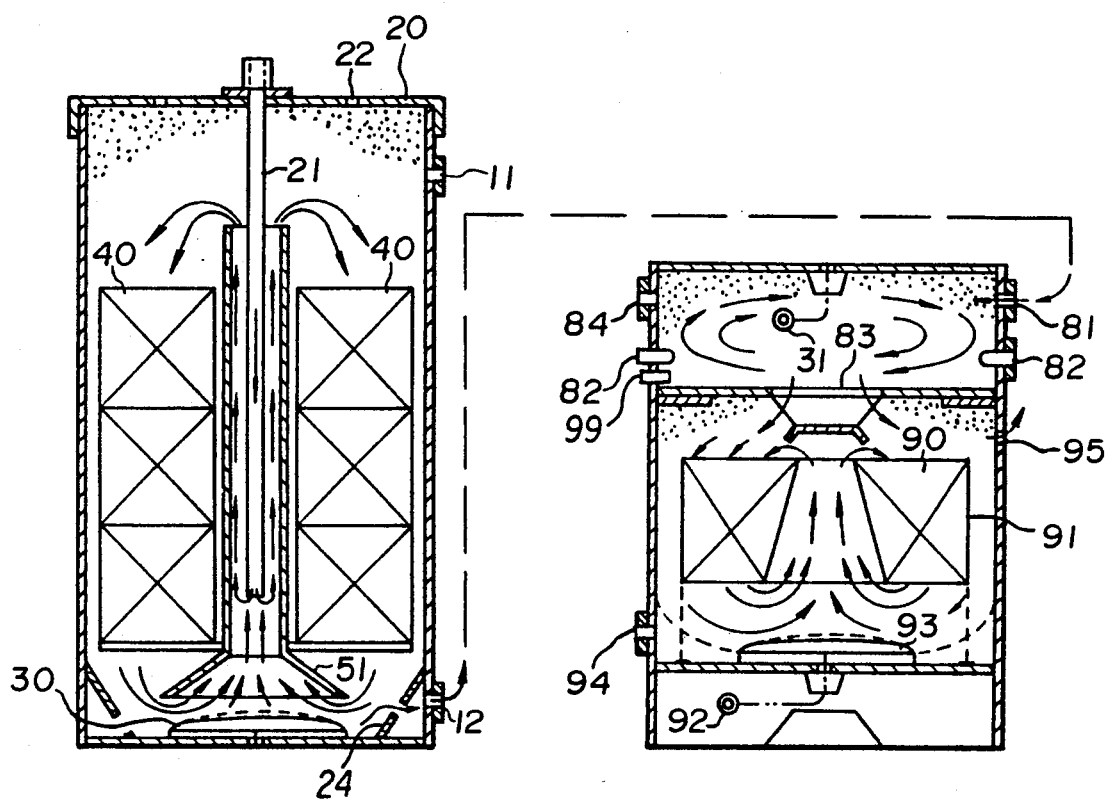
FIGS. 6 and 7 are sectional views illustrating two further embodiments of the invention.
Figure 7:
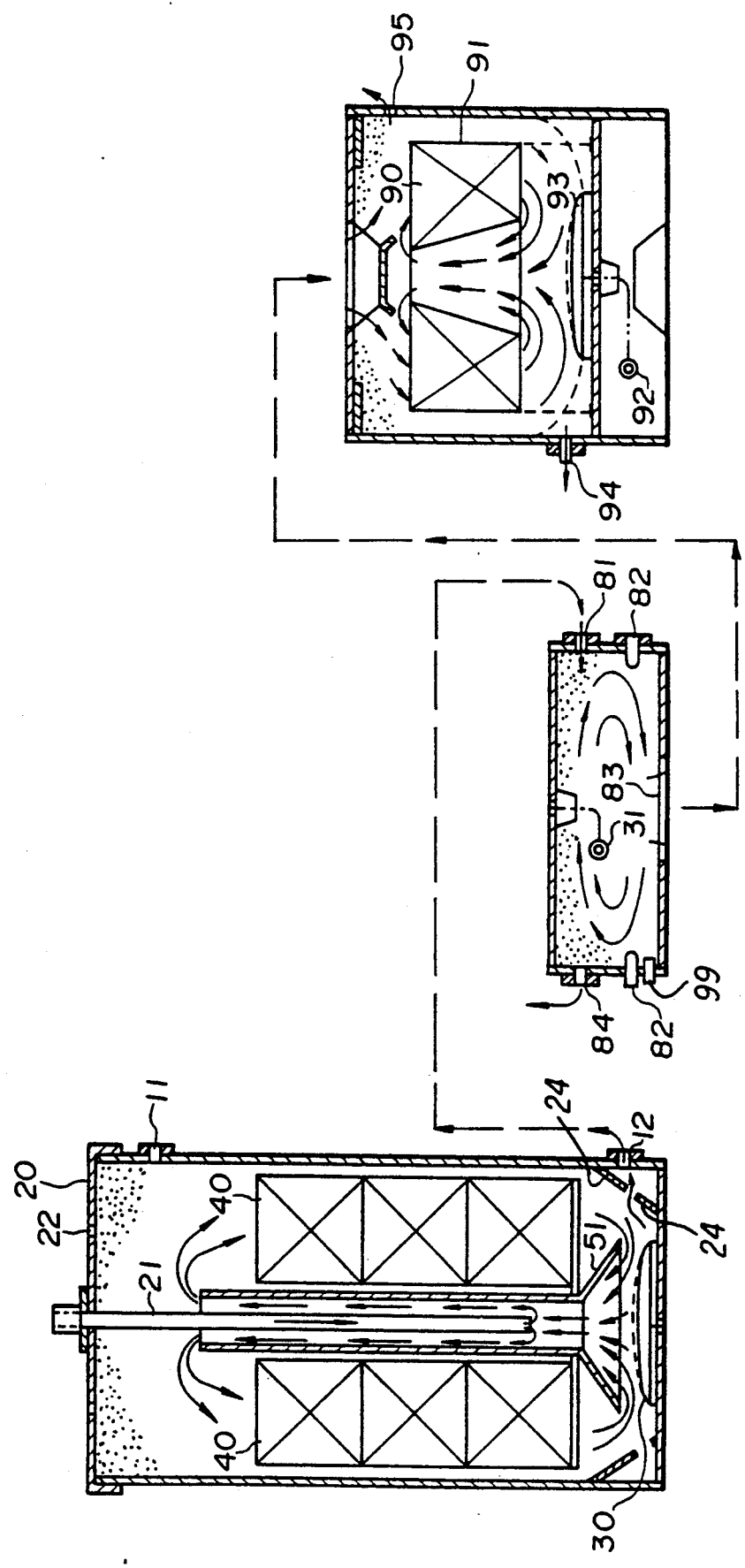

Although the embodiment shown in FIG. 5 consists of three tanks vertically arranged on each other, it will also be readily understood that a first-tank (tank A) and a second-tank (consisting of tanks B and C), or three tanks A, B and C, may be arranged horizontally side-by-side as shown in FIGS. 6 and 7 respectively.

The multi continuous-pore soft ceramic material will now be further explained. This ceramic material, which is described in detail in Japanese Laid Open Patent Publication No. 107582/90, may be summarized as follows:

(1) Porous soft ceramic material composed of 65–93 wt. % $SiO_2$, 5.2–15.2 wt. % $Al_2O_3$ and 0.1–0.7 wt. % $Fe_2O_3$, which has a network structure and pores of 20 to 120 μm average diameter so as to have an apparent porosity of 60 to 80%.

(2) Porous soft ceramic material which in addition to the components described in (1) contains 1.2–3.0 wt. % $K_2O$, 0.5–3.0 wt. % $Na_2O$, 0.5–2.0 wt. % $CaO$ and 0.5–3.2 wt. % $MgO$.

(3) Porous soft ceramic material which contains the components described in (1) and (2) and has fine pores of 0.03 to 0.7 μm diameter.

The above-mentioned porous soft ceramic materials (1), (2) and (3) can be manufactured by the following processes:

(1) Combustible expandable resin and slurry composed of $SiO_2$, $Al_2O_3$ and $Fe_2O_2$ are mixed together, dried by air and then burned at a temperature not higher than 1100° C.

(2) Combustible fine particles and/or fibrous materials and slurry composed of $SiO_2$, $Al_2O_3$ and $Fe_2O_3$ are mixed together, dried by air and then burned at a temperature not higher than 1100° C.

(3) Natural glass and slurry composed of $SiO_2$, $Al_2O_3$ and $Fe_2O_3$ are mixed together, dried by air and then burned at a temperature not higher than 1100° C.

Further, porous ceramic elements to be used in the present invention contain components as indicated in the following Table 1. Standard and more desirable contents of the components are also indicated in Table 1. In Table 1, and in Table 2 to be discussed hereinbelow, all figures represent percentages by weight.

TABLE 1

| Component | Standard Content | Preferable Content |
|---|---|---|
| $SiO_2$ | 65–93 | 75–80 |
| $Al_2O_3$ | 5.2–15.2 | 7.0–15.0 |
| $Fe_2O_3$ | 0.1–0.7 | 0.1–0.3 |

If a porous ceramic contains $SiO_2$ above the standard content, it loses coagulating power and easily loses its shape. It is not desirable to burn the ceramic at a higher temperature to prevent loss of the shape since the ceramic surface is vitrified by burning to become unfavorable for bacterial growth thereon.

If a porous ceramic contains $SiO_2$ below the standard content, it will not permit taking-off of bacteria therefrom for alternation of generations, whereby bacteria become anaerobic over time, resulting in the absence of aerobic bacteria in the porous ceramic element.

If a porous ceramic contains $Al_2O_3$ less than the standard value, it retards the bacteria's growth thereon, resulting in their death. Conversely, if a porous ceramic contains $Al_2O_3$ more than the standard value, it may have less shear strength and therefore be easily bent.

If a porous ceramic contains $Fe_2O_3$ more than the standard value, it may repress the bacteria's growth thereon resulting in their death. If a porous ceramic contains $Fe_2O_3$ less than the standard value, it may retard algae bacteria thereon.

It is further desirable that porous ceramic materials for use in the present invention contain components shown in Table 2 in addition to those shown in Table 1.

TABLE 2

| Components | Desirable Content | Optimum Content |
|---|---|---|
| $K_2O$ | 1.2–3.0 | 1.2–2.5 |
| $Na_2O$ | 0.5–3.0 | 0.7–2.0 |
| $CaO$ | 0.5–2.0 | 0.7–1.5 |

TABLE 2-continued

| Components | Desirable Content | Optimum Content |
|---|---|---|
| MgO | 0.5–3.2 | 0.5–2.0 |

If a ceramic contains $K_2O$ and $Na_2O_3$ more than the desirable contents, algae bacteria may hardly breed thereon. If a ceramic contains $K_2O$ less than the desirable content, algae bacteria may breed thereon but grow slowly.

If a ceramic contains CaO more than the desirable content, there may be the undesirable effect that the fissiparity of protozoa becomes difficult. If a ceramic contains CaO less than the desirable content, protozoa may develop on the ceramic but be weak.

If a ceramic contains MgO more than the desirable content, there may be observed an undesirable tendency to prevent algae bacteria from growing. If a ceramic contains MgO less than the desirable content, in many cases algae bacteria may hardly develop on the ceramic.

Furthermore, porous ceramic materials for use in the present invention have therein open pores of specified size at an apparent porosity of 60 to 80 or, preferably, 65 to 70.

The apparent porosity of the ceramic is defined as follows:

$$\text{Apparent porosity} = \frac{\text{Volume of open pores (mercury forced into pores)}}{\text{Apparent volume of all solids}} \times 100$$

The soft ceramic elements for use in the present invention must be such that open pores in them have an average diameter of 20 to 120 μm, preferably 26 to 56 μm and more desirably 30 to 50 μm, but their shapes are not especially limited.

We claim:

1. A water treating biological film apparatus comprising a first tank means, a first continuous-pore ceramic element means disposed in said first tank means comprising 65 to 93 weight % $SiO_2$, 5.2 to 15.2 weight % $Al_2O_3$ and 0.1 to 0.7 weight % $Fe_2O_3$ and being operable to treat said water in said first tank means with an aerobic biological film for BOD treatment, a second tank means receiving the BOD treated water from said first tank means and circulating said BOD treated water to centrifugally separate sludge therefrom, a third tank means receiving the water from said second tank means, and second continuous-pore ceramic element means in said second tank means comprising 65 to 93 weight % $SiO_2$, 5.2 to 15.2 weight % $Al_2O_3$ and 0.1 to 0.7 weight % $Fe_2O_3$ and being operable to treat said water in said third tank means with a facultatively anaerobic film for COD treatment.

2. A water treating biological film apparatus according to claim 1 wherein said first tank means has an upper portion, a lower portion and a space area intermediate said upper and lower portions, means at said upper portion for supplying water to be treated to said space area, means at said lower portion for supplying air to said space area, said first ceramic element means being disposed around said space area, and a water outlet at said lower portion.

3. A water treating biological film apparatus according to claims 1 or 2 wherein said second tank means has an upper portion, a water inlet at said upper portion of said second tank means for receiving treated water from said first tank means, and a water passage means in said second tank means for transferring the water to said third tank means.

4. A water treating biological film apparatus according to claims 1 or 2 wherein said third tank means has a bottom portion, and outlet means for said treated water at said bottom portion of said third tank means.

5. A water treating biological film apparatus according to claims 1 or 2 wherein said first, second and third tank means are disposed in vertical array with said first tank means overlying said second tank means and said second tank means overlying said third tank means.

6. A water treating biological film apparatus according to claims 1 or 2 wherein said first, second and third tank means are disposed in horizontal array with each of said first, second and third tank means being disposed side-by-side.

7. A water treating biological film apparatus according to claims 1 or 2 wherein second and third tank means are disposed in vertical array with said second tank means overlying said third tank means, said first tank means being disposed side-by-side with said vertically arrayed second and third tank means.

* * * * *